US 10,317,605 B2

(12) United States Patent
Takada et al.

(10) Patent No.: US 10,317,605 B2
(45) Date of Patent: Jun. 11, 2019

(54) PLANAR ILLUMINATION APPARATUS (71) Applicant: MINEBEA MITSUMI INC., Kitasaku-gun, Nagano (JP)

(72) Inventors: Shohei Takada, Hamamatsu (JP); Takashi Ishii, Fukuroi (JP)

(73) Assignee: MINEBEA MITSUMI INC., Kitasaku-gun (JP)

( * ) Notice: Subject to any disclaimer, the term of this patent is extended or adjusted under 35 U.S.C. 154(b) by 91 days.

(21) Appl. No.: 15/599,628

(22) Filed: May 19, 2017

(65) Prior Publication Data

US 2017/0343721 A1 Nov. 30, 2017

(30) Foreign Application Priority Data

May 26, 2016 (JP) ................................. 2016-105624

(51) Int. Cl.
*G02F 1/13* (2006.01)
*F21V 8/00* (2006.01)

(52) U.S. Cl.
CPC ......... *G02B 6/0013* (2013.01); *G02B 6/0065* (2013.01); *G02B 6/0073* (2013.01); *G02B 6/0083* (2013.01); *G02B 6/0086* (2013.01); *G02F 1/13* (2013.01)

(58) Field of Classification Search
CPC .. G02B 6/0013; G02B 6/0065; G02B 6/0073; G02B 6/0083; G02B 6/0086; G02F 1/13
See application file for complete search history.

(56) References Cited

U.S. PATENT DOCUMENTS

| 6,046,785 | A  | * | 4/2000  | Won ................... G02F 1/133615 349/58 |
| 6,126,467 | A  |   | 10/2000 | Ohashi |
| 6,443,741 | B1 |   | 9/2002  | Watanabe |
| 6,507,377 | B1 | * | 1/2003  | Jung ................. G02F 1/133308 349/58 |
| 6,828,721 | B2 | * | 12/2004 | Wakita .............. G02F 1/133308 313/365 |
| 6,977,694 | B2 | * | 12/2005 | Natsuyama ....... G02F 1/133308 349/58 |
| 6,992,736 | B2 | * | 1/2006  | Saito .................... G02B 6/0091 349/58 |
| 7,004,614 | B2 | * | 2/2006  | Tsai ..................... G02B 6/0031 349/58 |

(Continued)

FOREIGN PATENT DOCUMENTS

| JP | 2000-182739 A | 6/2000 |
| JP | 2000-182741 A | 6/2000 |

(Continued)

OTHER PUBLICATIONS

Oct. 2, 2018 Office Action issued in Japanese Patent Application No. 2016-105624.

*Primary Examiner* — Tsion Tumebo
(74) *Attorney, Agent, or Firm* — Oliff PLC (57) ABSTRACT

A planar illumination apparatus according to an embodiment includes a light guide plate configured to emit, from an exit surface, light incident from a side surface, a frame including a border that encloses the light guide plate, and a plate spring provided between the light guide plate and the border and configured to press the light guide plate in a first direction and in a second direction different from the first direction.

7 Claims, 8 Drawing Sheets

(56) References Cited

U.S. PATENT DOCUMENTS

| | | | | |
|---|---|---|---|---|
| 7,301,588 B2 * | 11/2007 | Ogawa | ............... | G02B 6/0088 |
| | | | | 349/58 |
| 7,377,682 B2 * | 5/2008 | Chang | ............... | G02B 6/0091 |
| | | | | 349/58 |
| 7,517,135 B2 * | 4/2009 | Yu | ............... | G02B 6/0091 |
| | | | | 349/58 |
| 7,626,654 B2 * | 12/2009 | Tsubokura | ............ | G02F 1/1333 |
| | | | | 349/58 |
| 8,870,437 B2 * | 10/2014 | Yoshikawa | ....... | G02F 1/133608 |
| | | | | 349/58 |
| 9,170,443 B2 * | 10/2015 | Wang | ............... | G02F 1/1333 |
| 2003/0164913 A1 * | 9/2003 | Ogawa | ............... | G02B 6/0088 |
| | | | | 349/113 |
| 2012/0170311 A1 | 7/2012 | Huang et al. | | |
| 2012/0287371 A1 * | 11/2012 | Oura | ............... | G02F 1/133615 |
| | | | | 349/60 |
| 2013/0286294 A1 | 10/2013 | Hosoki | | |

FOREIGN PATENT DOCUMENTS

| | | |
|---|---|---|
| JP | 2005-209483 A | 8/2005 |
| JP | 2008-234962 A | 10/2008 |
| JP | 2012-15000 A | 1/2012 |
| JP | 2014-049404 A | 3/2014 |
| WO | 2012/093595 A1 | 7/2012 |

* cited by examiner

FIG.14

PLANAR ILLUMINATION APPARATUS

CROSS-REFERENCE TO RELATED APPLICATIONS

The present application claims priority to and incorporates by reference the entire contents of Japanese Patent Application No. 2016-105624 filed in Japan on May 26, 2016.

BACKGROUND OF THE INVENTION

1. Field of the Invention

The present invention relates to a planar illumination apparatus.

2. Description of the Related Art

There is a planar illumination apparatus that supports a light guide plate arranged inside a frame, by pressing a side surface of the light guide plate. For example, there is a known planar illumination apparatus in which the light guide plate is supported by a rubber-made supporting portion arranged at each of corners of a frame and each of three side surfaces of the light guide plate is pressed by a pressing portion that has a curved plate-like shape. According to this known planar illumination apparatus, the existence of the pressing portion suppresses the movement of the light guide plate during transportation, making it possible to suppress the occurrence of rattling noise.

In the above-described known planar illumination apparatus, however, the rubber-made supporting portion expands by heat in a direction perpendicular to a light emitting surface of the light guide plate. In a case where the supporting portion expands in the direction perpendicular to the light emitting surface of the light guide plate, the supporting portion might push up an optical sheet arranged on the light emitting surface side of the light guide plate, leading to generation of creases on the optical sheet. The generation of the creases on the optical sheet might lead to a problem of the occurrence of uneven luminance, for example, on a screen of a liquid crystal display apparatus that uses the planar illumination apparatus as a backlight. This might also be a problem of low reliability against heat.

SUMMARY OF THE INVENTION

A planar illumination apparatus according to one embodiment of the present invention includes a light guide plate configured to emit, from an exit surface, light incident from a side surface, a frame including a border that encloses the light guide plate, and a plate spring provided between the light guide plate and the border and configured to press the light guide plate in a first direction and in a second direction different from the first direction.

DETAILED DESCRIPTION OF THE PREFERRED EMBODIMENTS

Hereinafter, a planar illumination apparatus according to an embodiment will be described with reference to the drawings. Note that the drawings do not necessarily represent the actual dimensional relations of individual elements and scales of the individual elements. Furthermore, different drawings may include portions using different dimensional relations and different scales.

EMBODIMENTS

Figure 1:
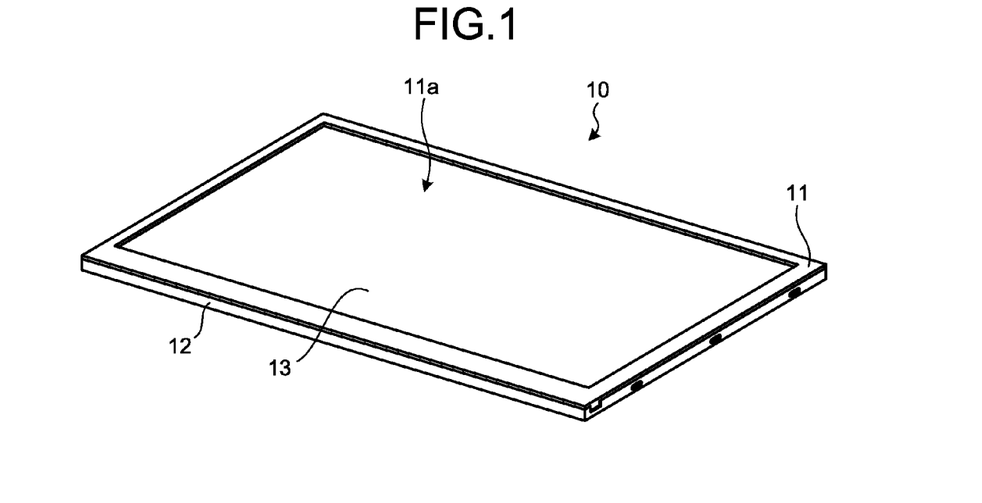
FIG. 1 is a perspective view of exemplary appearance of a planar illumination apparatus according to an embodiment.

FIG. 1 is a perspective view of exemplary appearance of a planar illumination apparatus according to an embodiment. As illustrated in an example in FIG. 1, a planar illumination apparatus 10 according to an embodiment includes an upper frame 11, a lower frame 12, and an optical sheet 13. Although not illustrated in FIG. 1, the planar illumination apparatus 10 according to an embodiment further includes a light guide plate 14, a plate spring 20, and a plurality of light emitting diodes (LEDs) 30, described below. When the planar illumination apparatus 10 is viewed in a horizontally placed state, the upper frame 11 corresponds to a frame positioned on an upper side, and the lower frame 12 corresponds to a frame positioned on a lower side.

The upper frame 11 includes an opening 11a. The light emitted from the optical sheet 13 passes through the opening 11a, and projected toward a liquid crystal display apparatus (not illustrated). The planar illumination apparatus 10 according to the present embodiment is used as a backlight of the liquid crystal display apparatus. The liquid crystal display apparatus is used, for example, on a car navigation system installed on a vehicle. Note that the optical sheet 13 is formed of a stack of a plurality of types of optical sheets. In an embodiment, a case where the optical sheet 13 is formed of three types of optical sheets 13a, 13b, and 13c (not illustrated in FIG. 1) being stacked in this order will be described.

Figure 2:
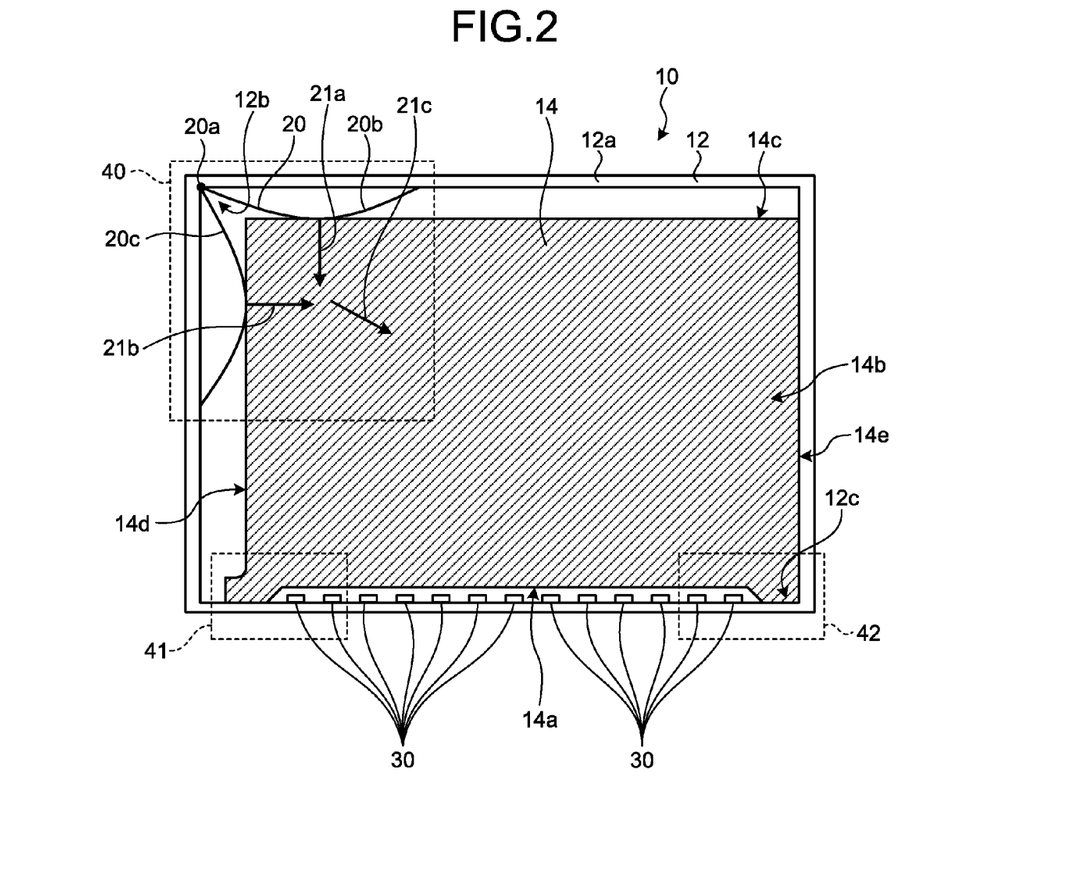
FIG. 2 is a diagram for illustrating an exemplary planar illumination apparatus according to an embodiment.
Figure 3:
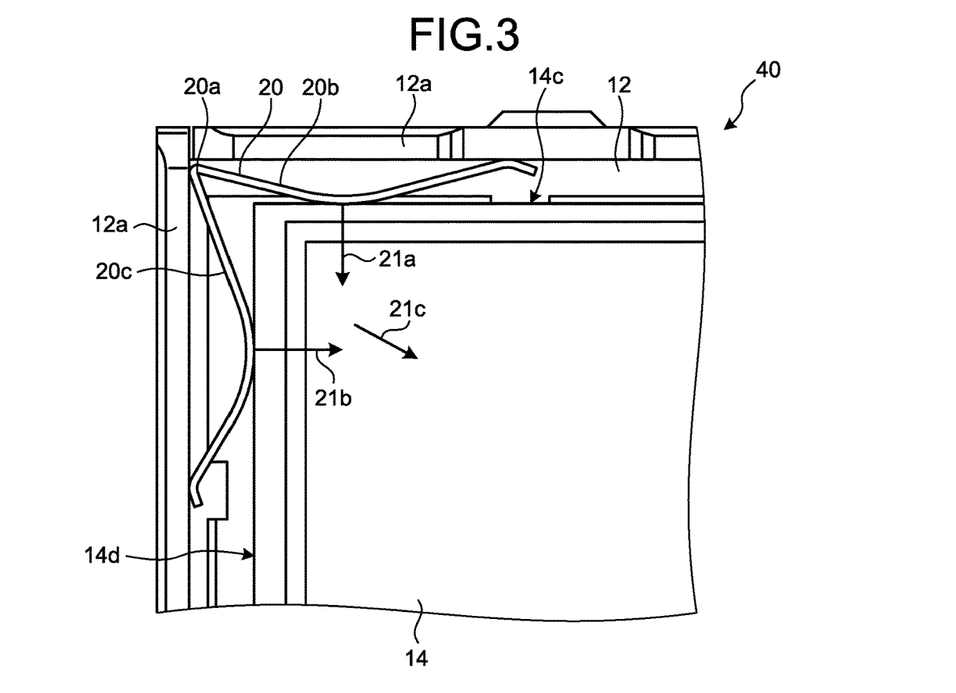
FIG. 3 is an enlarged view of a portion of a planar illumination apparatus illustrated in an example in FIG. 2.
Figure 4:
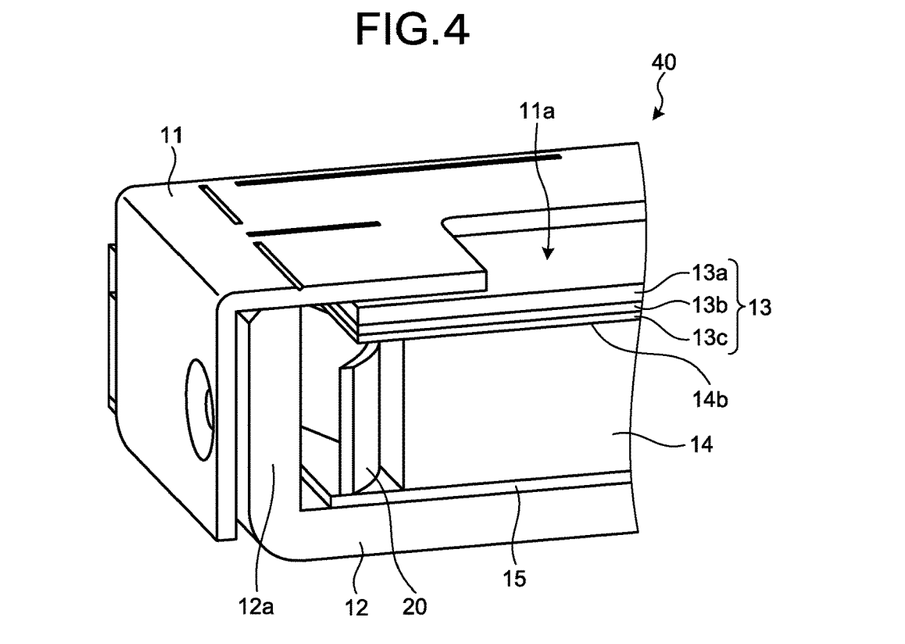
FIG. 4 is a cross-sectional view of a portion of the planar illumination apparatus illustrated in an example in FIG. 2.

FIG. 2 is a plan view of an exemplary planar illumination apparatus 10 according to an embodiment. FIG. 3 is an enlarged view of a portion 40 of the planar illumination apparatus 10 illustrated in an example in FIG. 2. FIG. 4 is a cross-sectional view of the portion 40 of the planar illumination apparatus 10 illustrated in the example in FIG. 2.

As illustrated in examples in FIGS. 2 to 4, the lower frame 12 includes a border 12a. The border 12a is formed on the lower frame 12 so as to enclose the optical sheet 13, the light guide plate 14, and a reflector 15. The optical sheet 13, the light guide plate 14, and the reflector 15 are arranged within a space formed by the border 12a. For example, as illustrated in an example in FIG. 4, the reflector 15, the light guide plate 14, and the optical sheet 13 are stacked in this order within the space formed by the border 12a.

The light guide plate 14 is formed in a rectangular shape in top view, using transparent material (e.g., polycarbonate resin). The light guide plate 14 includes, on its outer surface, two main surfaces, and a light incident side surface 14a, that is a side surface on which the LED 30 is arranged. The light emitted from the LED 30 is incident on the light incident side surface 14a. A main surface 14b among the two main surfaces is an exit surface from which the light incident from the light incident side surface 14a (light emitted from the LED 30) is emitted. Accordingly, the "main surface 14b" will also be referred to as the "exit surface 14b" in some cases. Note that the exit surface will also be referred to as a light emitting surface because the exit surface is a surface from which the light is emitted. A portion on the surface (main surface other than the main surface 14b among the two main surfaces) side opposite to the main surface 14b of the light guide plate 14 includes a light redirecting pattern formed with a plurality of dots, for example. Forming the light redirecting pattern changes the travel direction of the light that travels inside the light guide plate 14, thereby emitting the light from the exit surface 14b. That is, the planar illumination apparatus 10 according to an embodiment is an edge-lit illumination apparatus.

The reflector 15 reflects the light that leaks from a surface on the opposite side of the exit surface 14b, and returns the light to the light guide plate 14. The reflector 15 is provided on the surface on the opposite side of the exit surface 14b of the light guide plate 14.

The LED 30 is a point-like light source (point light source). The LED 30 is a pseudo-white LED formed with a blue LED and a yellow phosphor, for example. The plurality of LEDs 30 is arranged with a predetermined interval along a long-side direction of the light incident side surface 14a, with its light emitting surface facing the light incident side surface 14a of the light guide plate 14. The plurality of LEDs 30 emits light toward the light incident side surface 14a. In this manner, the plurality of LEDs 30 emits the light to be incident on the light incident side surface 14a.

The plate spring 20 is provided between the light guide plate 14 and the border 12a of the lower frame 12, and supports the light guide plate 14 by pressing the light guide plate 14 in a direction 21a and a direction 21b. For example, the plate spring 20 includes stainless steel. For example, the plate spring 20 is an elastic member formed with a plate-like bending member formed of stainless steel, having substantially an L-shape in side view.

As illustrated in examples in FIGS. 2 and 3, the plate spring 20 includes a portion 20b that is a portion from a bending portion 20a to one end portion, and a portion 20c that is a portion from the bending portion 20a to the other end portion. Each of the portion 20b and the portion 20c is curved so as to protrude toward the light guide plate 14 side. Accordingly, the portion 20b presses a side surface 14c on the opposite side of the light incident side surface 14a of the light guide plate 14 in the direction 21a from the side surface 14c toward the light incident side surface 14a, while the portion 20c presses a side surface 14d of the light guide plate 14 in the direction 21b from the side surface 14d toward a side surface 14e. Note that the direction 21a is an exemplary first direction, while the direction 21b is an exemplary second direction, being different from the first direction. As a result, the force applied in the direction 21a is combined with the force applied in the direction 21b, and the combined force is applied toward the light guide plate 14, in a new direction 21c. That is, the light guide plate 14 is pressed in the direction 21c. This configuration fixes the position of the light guide plate 14 in a state being abutted to a corner 12c that is diagonally opposed to a corner 12b on which the plate spring 20 is disposed, among the four corners inside the border 12a of the lower frame 12. Since the plate spring 20 supports and fixes the light guide plate 14 in this manner, it is possible to suppress the occurrence of rattling noise due to collision of the light guide plate 14 with the lower frame 12.

Moreover, with the planar illumination apparatus 10 according to the present embodiment, the plate spring 20 formed of stainless steel is provided at solely one corner 12b of four corners, making it possible to achieve a planar illumination apparatus with a simple configuration and low cost.

Figure 5:
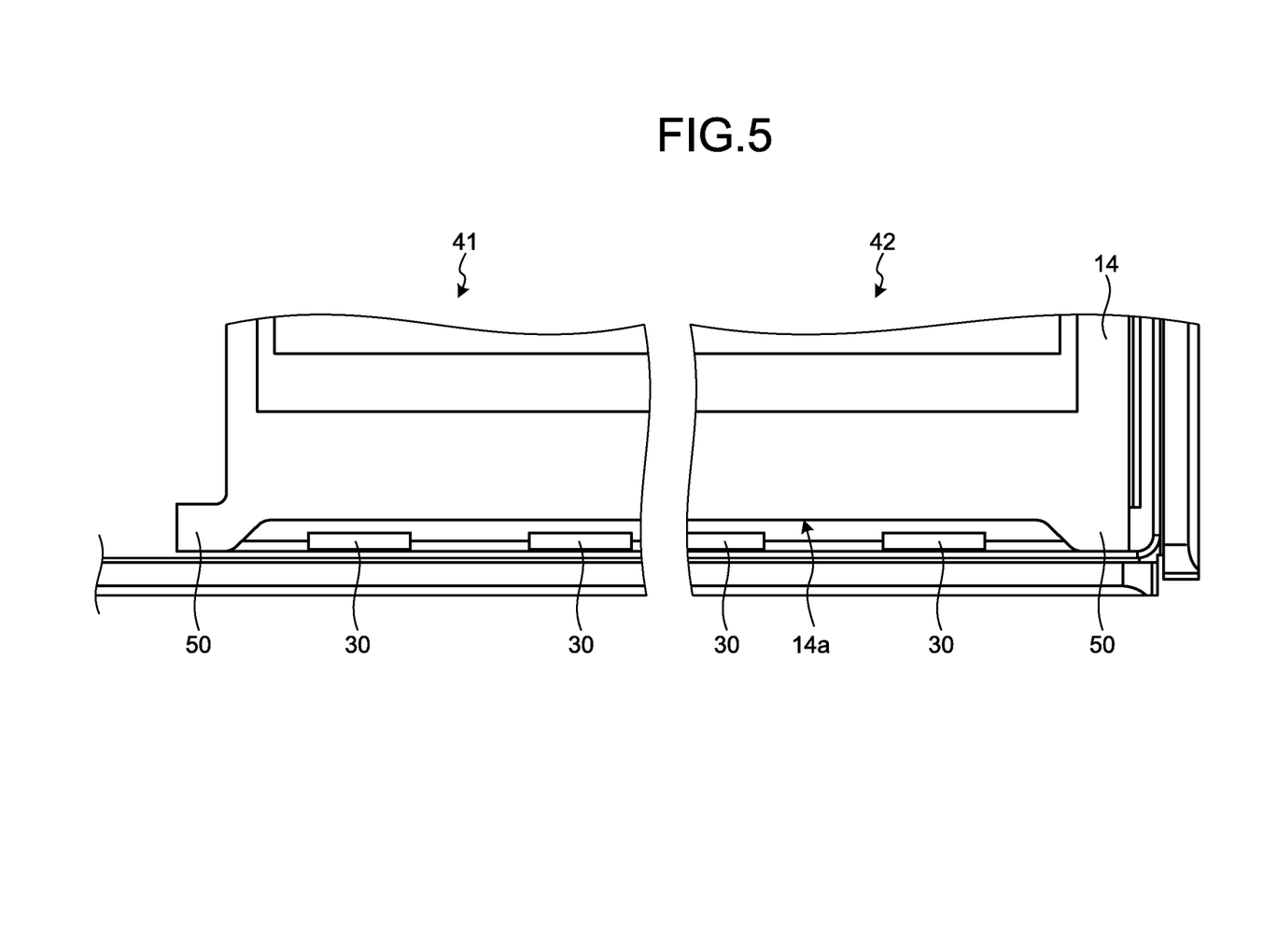
FIG. 5 is enlarged views of two portions of the planar illumination apparatus illustrated in an example in FIG. 2.

FIG. 5 is an enlarged view of portions 41 and 42 of the planar illumination apparatus 10 illustrated in an example in FIG. 2. As illustrated in an example in FIG. 5, the light incident side surface 14a includes a plurality of protrusions 50. For example, the protrusion 50 is formed at both ends in a long-side direction of the light incident side surface 14a.

When the light guide plate 14 is pressed by the plate spring 20, the position of the light guide plate 14 is fixed in a state where the plurality of protrusions 50 is abutted to the border 12a of the lower frame 12. The LED 30 is disposed between the two protrusions 50 and emits light to be incident on the light incident side surface 14a. In this manner, according to the present embodiment, the protrusion 50 formed on the light incident side surface 14a side is abutted to the border 12a, thereby fixing the position of the light guide plate 14. Therefore, with the planar illumination apparatus 10 according to the present embodiment, a distance L between the LED 30 and the light incident side surface 14a is maintained to be constant. Accordingly, it is possible to maintain an optically stable state.

Figure 6:
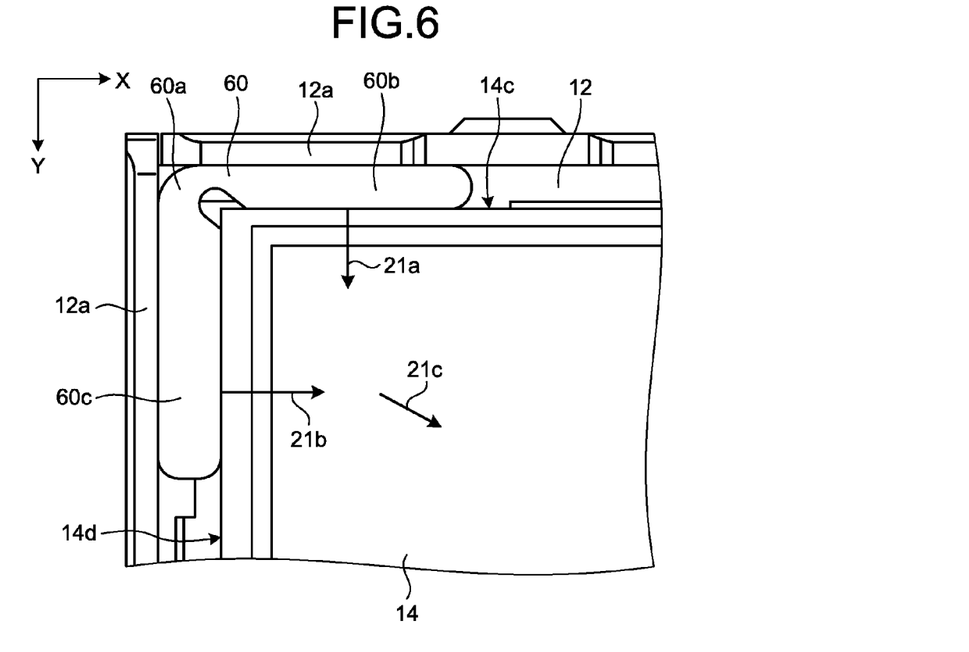
FIG. 6 is an enlarged view of a portion of a planar illumination apparatus according to a comparative example that corresponds to a portion of the planar illumination apparatus according to an embodiment.
Figure 7:
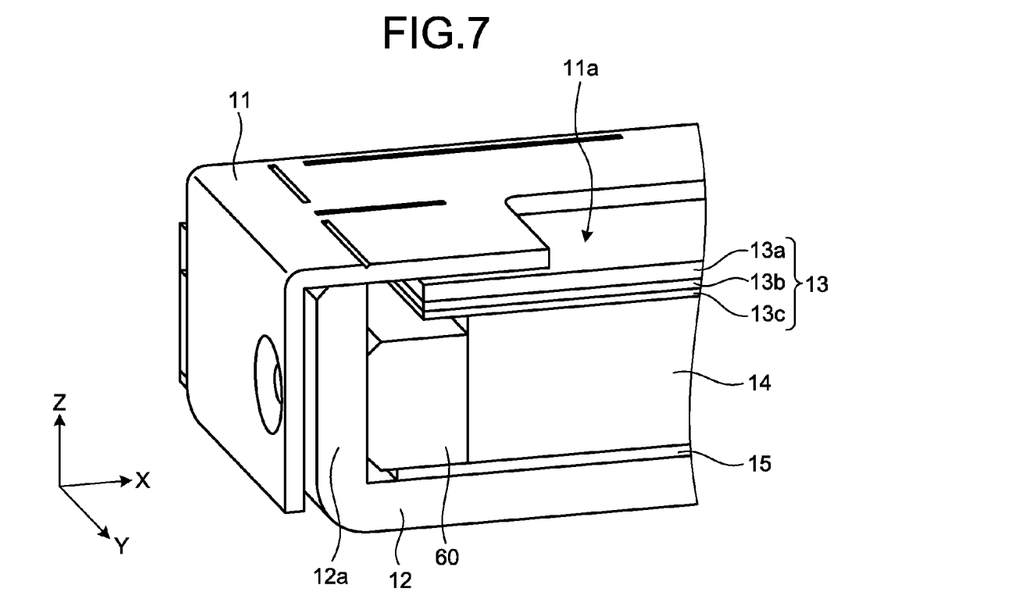
FIG. 7 is a cross-sectional view of the portion of the planar illumination apparatus according to the comparative example that corresponds to the portion of the planar illumination apparatus according to an embodiment.

As a comparative example, a planar illumination apparatus that uses rubber in place of the plate spring 20 will be described. FIG. 6 is an enlarged view of a portion of a planar illumination apparatus according to a comparative example that corresponds to the portion 40 of the planar illumination apparatus 10 according to an embodiment. FIG. 7 is a cross-sectional view of the portion of the planar illumination apparatus according to the comparative example that corresponds to the portion 40 of the planar illumination apparatus 10 according to an embodiment.

As illustrated in examples in FIGS. 6 and 7, rubber 60 according to the comparative example is disposed between the light guide plate 14 and the border 12a of the lower frame 12, and supports the light guide plate 14 by pressing the light guide plate 14 in the direction 21a and the direction 21b.

Moreover, as illustrated in examples in FIGS. 6 and 7, the rubber 60 includes a portion 60b that is a portion from a bending portion 60a to one end portion, and a portion 60c that is a portion from the bending portion 60a to the other end portion. Since each of the portion 60b and the portion 60c is an elastic body, the portion 60b presses the side surface 14c in the direction 21a, while the portion 60c presses the side surface 14d in the direction 21b. As a result, the light guide plate 14 is pressed in the direction (third direction) 21c. This configuration fixes the position of the light guide plate 14 in a state of being abutted to the corner 12c (refer to FIG. 2).

Figure 8:
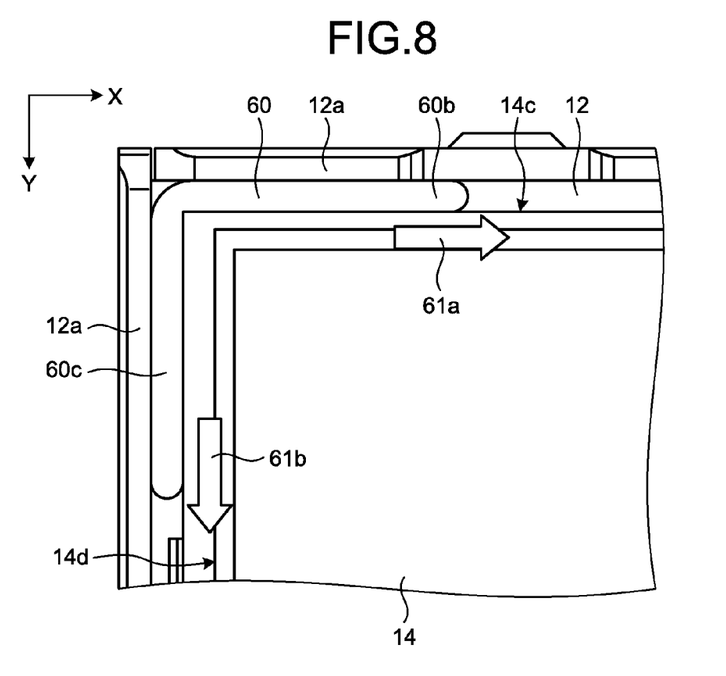
FIG. 8 is a diagram illustrating an exemplary state of a light guide plate that has expanded by heat, on the planar illumination apparatus according to the comparative example.
Figure 9:
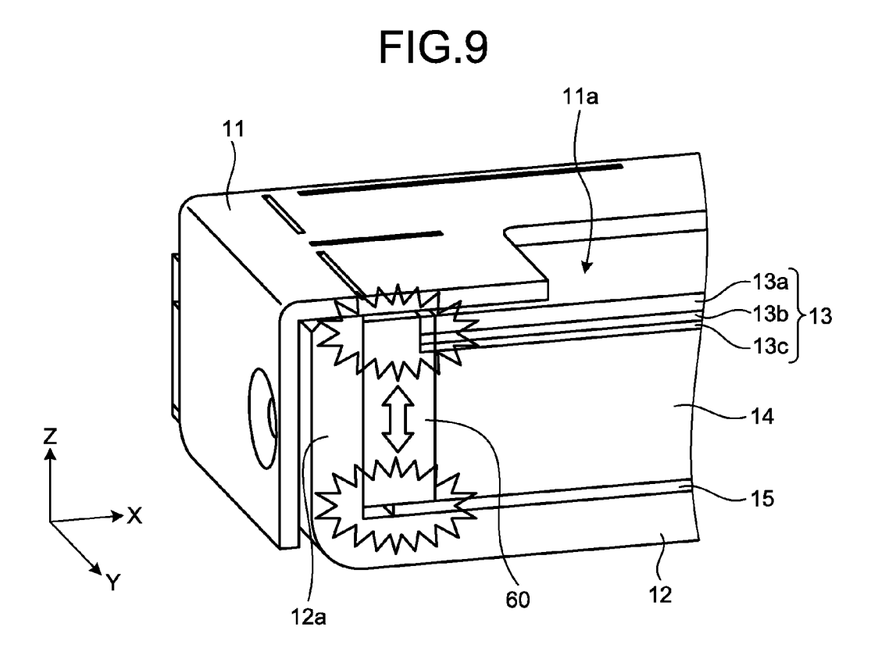
FIG. 9 is a diagram illustrating an exemplary state of the light guide plate that has expanded by heat, on the planar illumination apparatus according to the comparative example.

Now, a case where the light guide plate 14 has expanded by heat on the planar illumination apparatus according to the comparative example will be described. FIGS. 8 and 9 are diagrams illustrating an exemplary state of the light guide plate 14 that has expanded by heat, on the planar illumination apparatus according to the comparative example. As illustrated in an example in FIG. 8, when the light guide plate 14 has expanded in a Y-direction by heat and applies force to the portion 60b, the portion 60b is deformed to extend in an X-direction (direction indicated by an arrow 61a; long-side direction of the exit surface 14b). Moreover, as illustrated in the example in FIG. 8, when the light guide plate 14 has expanded in the X-direction by heat and applies force to the portion 60c, the portion 60c is deformed to extend in the Y-direction (direction indicated by an arrow 61b; short-side direction of the exit surface 14b).

At this time, as illustrated in an example in FIG. 9, the rubber 60 (rubber 60b and rubber 60c) is deformed to extend in a Z-direction (direction perpendicular to the exit surface 14b). This process causes the rubber 60 to push up the optical sheet 13. With the optical sheet 13 being pushed up, creases are generated on the optical sheet 13. This causes the occurrence of uneven luminance on the screen of the liquid crystal display apparatus that uses the planar illumination apparatus as a backlight. That is, the planar illumination apparatus according to the comparative example has low reliability against heat.

In order to prevent the optical sheet 13 from being pushed up by the rubber 60, there might be an idea of providing a predetermined distance (gap) between the border 12a and an end portion of the optical sheet 13. However, in a case where a predetermined distance is provided, it is difficult to shorten the distance between the border 12a and the end portion of the optical sheet 13, and thus, difficult to achieve a slimmer border on the planar illumination apparatus according to the comparative example.

Figure 10:
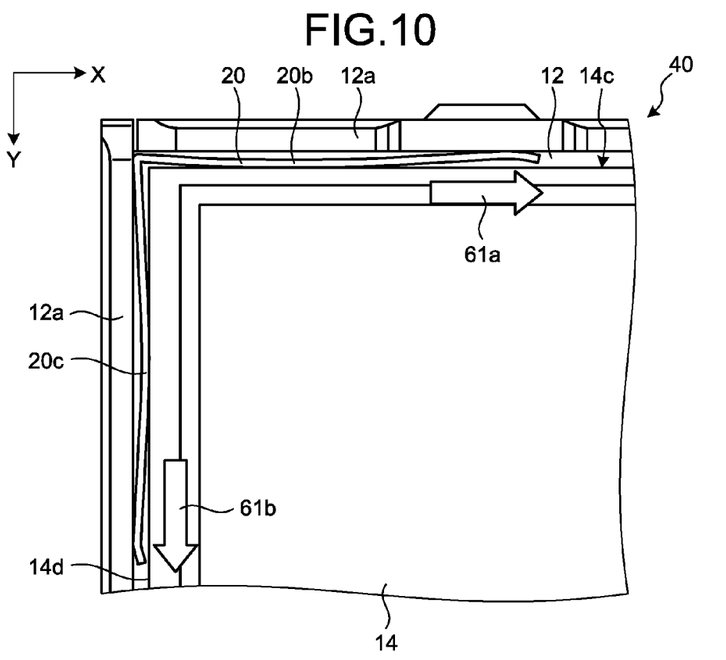
FIG. 10 is a diagram illustrating an exemplary state of the light guide plate that has expanded by heat, on the planar illumination apparatus according to an embodiment.
Figure 11:
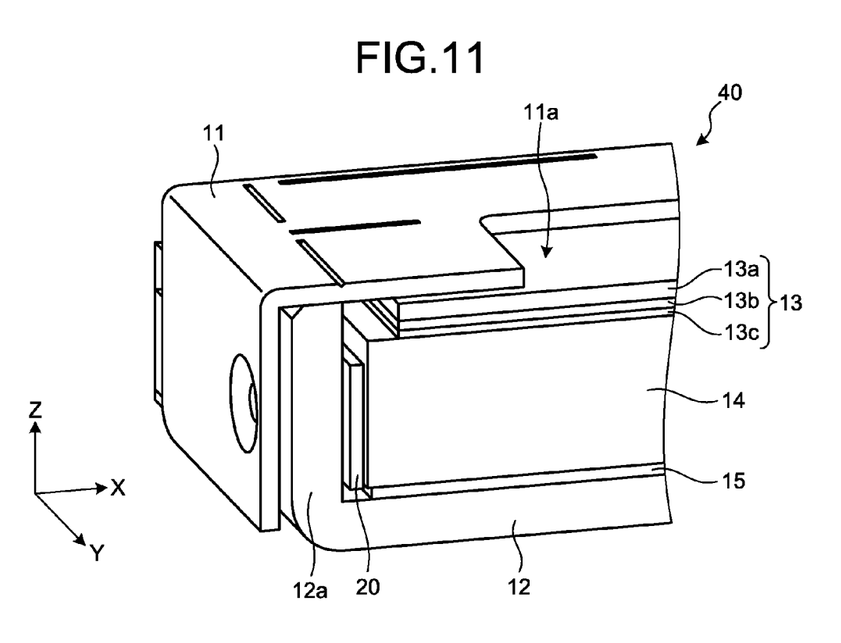
FIG. 11 is a diagram illustrating an exemplary state of a light guide plate that has expanded by heat, on the planar illumination apparatus according to the present embodiment.

Now, a case where the light guide plate 14 has expanded by heat on the planar illumination apparatus 10 according to the present embodiment will be described with reference to FIGS. 10 and 11. FIGS. 10 and 11 are diagrams illustrating an exemplary state of the light guide plate 14 that has expanded by heat, on the planar illumination apparatus 10 according to an embodiment. As illustrated in an example in FIG. 10, when the light guide plate 14 has expanded in the Y-direction by heat and applies force to the portion 20b, the portion 20b is deformed to extend in the X-direction (direction indicated by an arrow 61a; long-side direction of the exit surface 14b). Moreover, as illustrated in an example in FIG. 10, when the light guide plate 14 has expanded in the X-direction by heat and applies force to the portion 20c, the portion 20c is deformed to extend in the Y-direction (direction indicated by an arrow 61b; short-side direction of the exit surface 14b). Note that the thickness of the plate spring 20 may be formed in a range of 0.1 mm to 0.2 mm. Accordingly, the side surface 14c and the side surface 14d of the light guide plate 14 may expand to a position that is 0.1 mm to 0.2 mm away from the border 12a. Therefore, with the planar illumination apparatus 10 according to the present embodiment, it is possible to widely permit the expansion of the light guide plate 14.

At this time, the plate spring 20 according to the present embodiment does not expand in the Z-direction (direction perpendicular to the exit surface 14b), as illustrated in an example in FIG. 11. That is, the plate spring 20 is configured so as not to be deformed in the direction perpendicular to the exit surface 14b in a case where force is applied from the light guide plate 14. Accordingly, with the planar illumination apparatus 10 according to the present embodiment, the optical sheet 13 is not pushed up in a case where the light guide plate 14 has expanded by heat. Therefore, with the planar illumination apparatus 10 according to the present embodiment, it is possible to suppress the occurrence of creases on the optical sheet 13. Consequently, it is possible to suppress the occurrence of uneven luminance on the screen of the liquid crystal display apparatus that uses the planar illumination apparatus 10 as a backlight. That is, the planar illumination apparatus 10 according to the present embodiment has high reliability against heat.

Moreover, in the present embodiment, since the optical sheet 13 is not pushed up by the plate spring 20, it is possible to shorten the distance between the border 12a and the end portion of the optical sheet 13. Accordingly, with the planar illumination apparatus 10 according to the present embodiment, it is possible to achieve a slimmer border.

The planar illumination apparatus 10 according to the present embodiment has been described as above. As described above, with the planar illumination apparatus 10 according to the present embodiment, it is possible to suppress the occurrence of rattling noise. Additionally, as described above, the planar illumination apparatus 10 according to the present embodiment has high reliability against heat. Accordingly, with the planar illumination apparatus 10 according to the present embodiment, it is possible to achieve high reliability while suppressing the rattling noise.

First Modification Example of Embodiment

While the above-described embodiment assumes a case where the number of plate springs 20 is one, the number of plate springs 20 may be plural. Now, an embodiment in a case where there is a plurality of plate springs 20 will be described as a first modification example. Note that, while there are two plate springs 20 in an exemplary case of the following description, the number of plate springs 20 may be three or more. Moreover, for the configuration similar to the configuration of the above-described embodiment, same reference signs will be attached and description for the configuration will be omitted in some cases.

Figure 12:
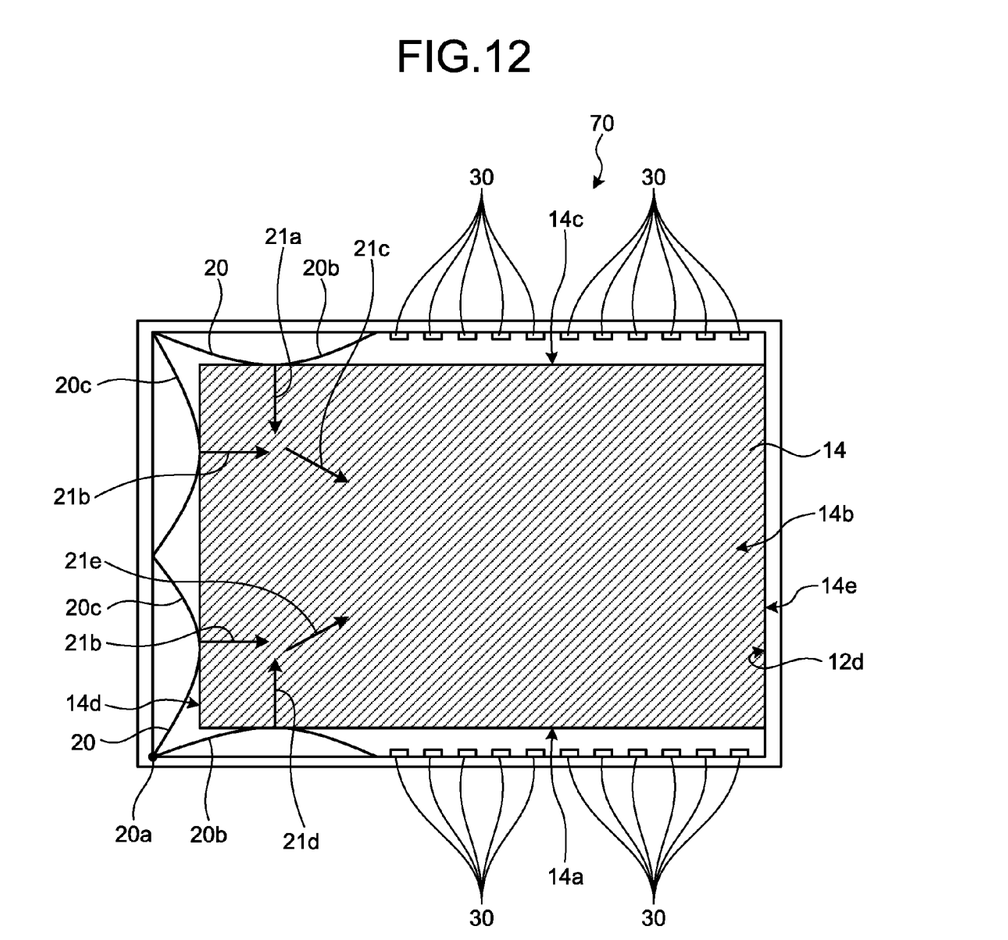
FIG. 12 is a plan view of an exemplary planar illumination apparatus according to a first modification example of an embodiment.

FIG. 12 is a plan view of an exemplary planar illumination apparatus 70 according to the first modification example of an embodiment. As illustrated in an example in FIG. 12, the planar illumination apparatus 70 includes two plate springs 20. Moreover, in the planar illumination apparatus 70, the plurality of LEDs 30 is arranged also on the side surface 14c side in addition to the light incident side surface 14a side.

The plurality of LEDs 30 disposed on the side surface 14c side is arranged with a predetermined interval along the long-side direction of the side surface 14c, in a state where light emitting surfaces of the LEDs 30 facing the side surface 14c of the light guide plate 14. Subsequently, the plurality of LEDs 30 arranged on the side surface 14c side emits light toward the side surface 14c. In this manner, the plurality of LEDs 30 arranged on the side surface 14c side emits light to be incident on the side surface 14c. The light incident on the side surface 14c is emitted from the exit surface 14b, similarly to the light incident on the light incident side surface 14a.

Among the two plate springs 20, the plate spring 20 provided on the side surface 14c side has a configuration similar to the configuration of the plate spring 20 described in the above embodiment, and thus, description thereof will be omitted. The plate spring 20 provided on the light incident side surface 14a side includes a portion 20b that is a portion from a bending portion 20a to one end portion, and a portion 20c that is a portion from the bending portion 20a to the other end portion. Each of the portion 20b and the portion 20c is curved so as to protrude toward the light guide plate 14 side. Accordingly, the portion 20b presses the light incident side surface 14a of the light guide plate 14 in a direction 21d from the light incident side surface 14a toward the side surface 14c, while the portion 20c presses the side surface 14d of the light guide plate 14 in the direction 21b from the side surface 14d toward the side surface 14e. As a result, the force added in the direction 21d is combined with the force added in the direction 21b, and this combined force is added toward the light guide plate 14 in a direction 21e. That is, the light guide plate 14 is pressed in the direction 21e. With this configuration, the position of the light guide plate 14 is fixed in a state of being abutted to a side 12d among the four sides of the border 12a of the lower frame 12. Since the plate spring 20 supports and fixes the light guide plate 14 in this manner, it is possible to suppress the occurrence of rattling noise due to collision of the light guide plate 14 with the lower frame 12.

Additionally, the planar illumination apparatus 70 according to the first modification example has high reliability against heat similarly to the planar illumination apparatus 10 according to an embodiment. Accordingly, with the planar illumination apparatus 70 according to the first modification example, it is possible to achieve high reliability while suppressing the rattling noise.

Second Modification Example of Embodiment

In the above-described description of the embodiment and the first modification example, the light guide plate 14 has a rectangular shape, and the plate spring 20 presses a 90 degree corner portion of the light guide plate 14. The shape of the light guide plate 14, however, may be a shape other than the rectangular shape (that is, an irregular shape). At this time, the plate spring 20 may press a portion other than the 90 degree corner portion, of the light guide plate 14. Now, an embodiment like this will be described as a second modification example of the embodiment. Note that, for the configuration similar to the configuration of the above-described embodiment and the first modification example, same reference signs will be attached and description for the configuration will be omitted in some cases.

Figure 13:
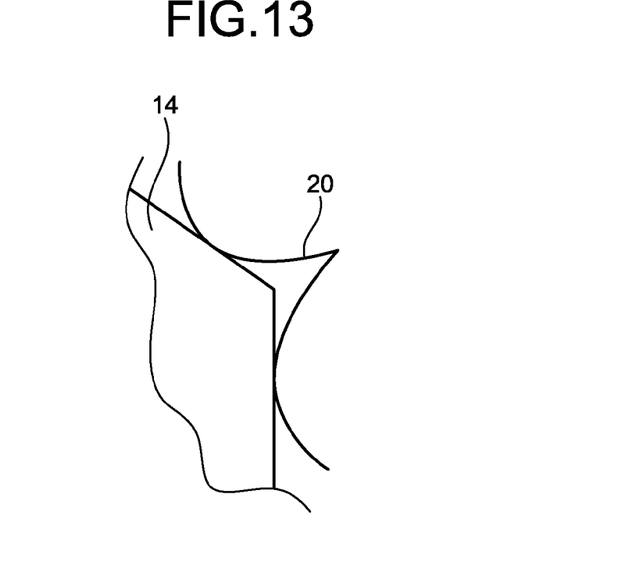
FIG. 13 is a diagram illustrating a portion in a case where the light guide plate has a shape other than a rectangle.
Figure 14:
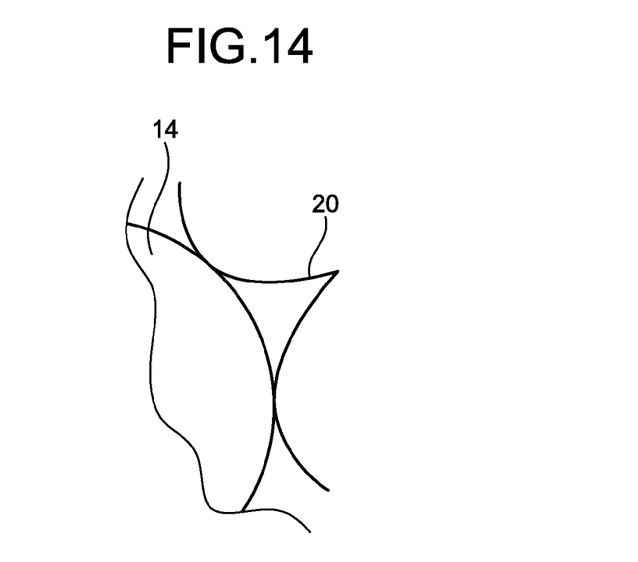
FIG. 14 is a diagram illustrating a portion in a case where the light guide plate has a shape other than a rectangle.

FIGS. 13 and 14 are diagrams each illustrating a portion in a case where the light guide plate 14 has a shape other than a rectangle. As illustrated in an example in FIG. 13, the light guide plate 14 may have a shape including an angle greater than 90 degrees. In this case, the plate spring 20 may be provided so as to press the corner portion having the angle greater than 90 degrees.

Moreover, as illustrated in an example in FIG. 14, the light guide plate 14 may have a shape including a curved external edge portion. In this case, the plate spring 20 may be provided so as to press this portion.

Note that, while in each of the above-described embodiment, the first modification example, and the second modification example, cases where details of the above-described embodiment, the first modification example, and the second modification example are applied to the edge-lit illumination apparatus have been described, it is also allowable to apply the details of the above-described embodiment, the first modification example, and the second modification example to a direct-lit planar illumination apparatus.

According to an aspect of the present invention, it is possible to achieve high reliability while suppressing the occurrence of rattling noise.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination apparatus comprising:
   a light guide plate configured to emit, from an exit surface, light incident from a side surface;
   a frame including a border that encloses the light guide plate; and
   a plate spring provided between the light guide plate and the border at solely one inner corner of inner corners of the frame, and configured to press the light guide plate so that at least a portion of the light guide plate abuts another inner corner that is diagonally opposed to the one inner corner where the plate spring is provided.

2. The planar illumination apparatus according to claim 1, wherein
   the plate spring is configured to not be deformed in a direction perpendicular to the exit surface in a case where force is applied from the light guide plate.

3. The planar illumination apparatus according to claim 1, wherein
   the plate spring includes stainless steel.

4. The planar illumination apparatus according to claim 1, further comprising
   an optical sheet arranged on a side of the exit surface.

5. The planar illumination apparatus according to claim 1, wherein
   the light guide plate includes a plurality of protrusions on the side surface on which the light becomes incident, and one of the plurality of protrusions abuts the other inner corner that is diagonally opposed to the one inner corner where the plate spring is provided when the light guide plate is pressed by the plate spring, the planar illumination apparatus further comprising a light source arranged between the protrusions and configured to emit light to be incident on the side surface.

6. The planar illumination apparatus according to claim 1, wherein
   the plate spring includes a first portion that is a portion from a bending portion of the plate spring to one end portion of the plate spring, and a second portion that is a portion from the bending portion to the other end portion of the plate spring, and each of the first portion and the second portion is curved so as to protrude toward the light guide plate.

7. The planar illumination apparatus according to claim 6, wherein
the bending portion of the plate spring is attached to the one inner corner.

* * * * *